Figure 1:
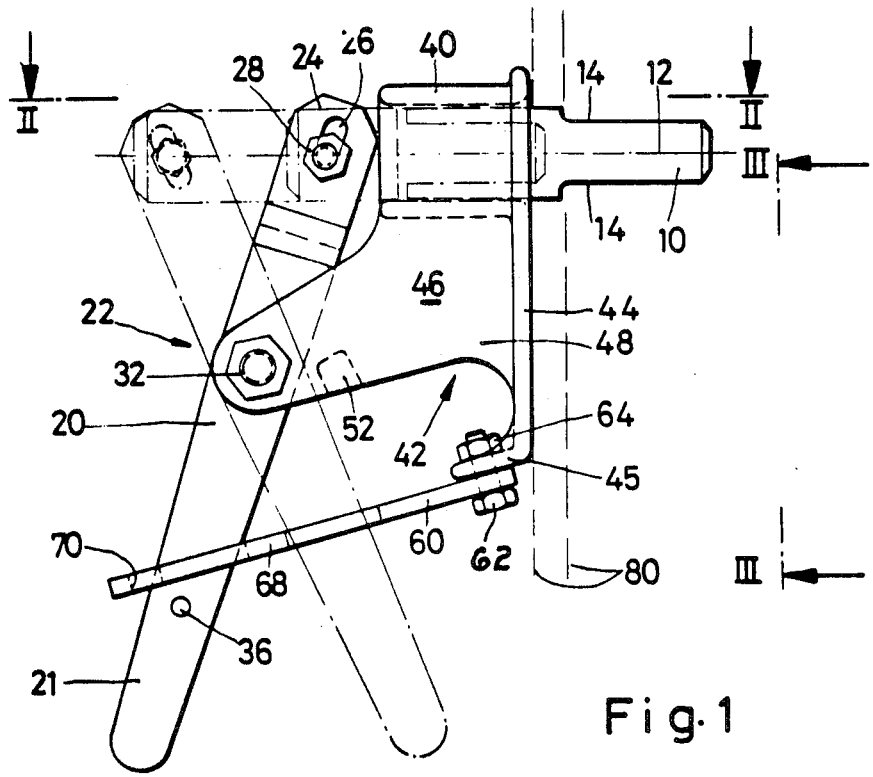

United States Patent [19]

Schulz et al.

[11] Patent Number: 4,486,132
[45] Date of Patent: Dec. 4, 1984

[54] DEVICE FOR FRONT END LOCKING OF CONTAINERS

[76] Inventors: Gerd Schulz, Besselstrasse 9, Fed. Rep. of Germany; Hans-Peter Hartleif, Rothergskamp 20 c, both of 2100 Hamburg 90, Fed. Rep. of Germany

[21] Appl. No.: 308,458

[22] Filed: Oct. 5, 1981

[30] Foreign Application Priority Data

Oct. 11, 1980 [DE] Fed. Rep. of Germany ....... 3038461

[51] Int. Cl.³ ............................ B60P 7/08; B60P 7/13; B61D 45/00
[52] U.S. Cl. ..................................... 410/81; 108/55.1; 410/91
[58] Field of Search ........................ 410/66, 77, 80, 81, 410/87, 88, 90, 91, 9; 108/51.1, 55.1, 55.3

[56] References Cited

U.S. PATENT DOCUMENTS

| 2,427,603 | 9/1947 | Higgins | 410/80 |
| 3,107,634 | 10/1963 | Gutridge | 410/81 |
| 3,993,344 | 11/1976 | Bennett | 108/55.1 |
| 4,352,517 | 10/1982 | Bertolini | 410/81 |
| 4,369,995 | 1/1983 | Harder, Jr. | 410/9 X |

FOREIGN PATENT DOCUMENTS 1282631 7/1972 United Kingdom ................. 410/66

Primary Examiner—Howard Beltran
Attorney, Agent, or Firm—Wood, Herron & Evans

[57] ABSTRACT

A device for the front end locking of containers on a chassis comprising a lock bolt movable in a guideway approximately parallel with the longitudinal axis of the chassis and between a locking and a release position while coupled to an operating handle which is swivelable on a holding fixture. The guideway and holding fixture are jointly fixed on a mounting plate oriented perpendicular to the plane of movement of the operating handle. The mounting plate is located on the end of the guideway facing the locking part of the lock bolt.

7 Claims, 3 Drawing Figures

DEVICE FOR FRONT END LOCKING OF CONTAINERS

The invention concerns a device for the, specifically end-side, locking of chassis type containers (end locking) with a lock bolt which is movable in a guideway approximately parallel with the longitudinal axis of the chassis between a locked and a released position and is coupled to an operating handle which swivels in a mounting.

Devices of that type have been known long since. They are used especially on the front ends of tractor trailer chassis instead of vertically movable container locking arrangements. The lock bolts of such end locking arrangements are horizontally movable between their released and locked position. They absorb the container forces which act upward and sideways, whereas the forces acting in and opposite to the direction of travel are absorbed by other means. Unlike the customary twist lock arrngements, the end locking arrangements offer the advantage of not affecting the overall height underneath the chassis. The disadvantage of the prior end locking arrangements was essentially constituted by their high repair costs and, partly, also by their comparatively high initial purchase costs.

Therefore, the problem underlying the invention was to improve the prior end locking arrangements to the effect that the initial purchase and installation costs as well as the costs of any repairs will possibly be lowered and/or, at the most, subproportionally influenced by rising payroll costs. This problem is inventionally solved in that the guideway and mounting are permanently arranged, jointly, on a mounting plate with a perpendicular orientation to the plane of movement of the operating handle, and in that the mounting plate is located on that end of the guideway which faces the locked part of the lock bolt.

This solution has the great advantage that the end locking arrangements can now be produced independently from the operation and operational procedures of the vehicle manufacturer, requiring the latter only to fasten them on the vehicle. Especially useful for the vehicle manufacturer is the fact that the installation expense is drastically reduced because he merely needs to mount a single assembly to the chassis in the fashion described hereinbelow, i.e., the entire end locking arrangement, and this job is considerably simpler yet than with locking arrangements pertaining to the state of the art.

The preferred embodiment of the invention comprises a guideway, a guideway holding fixture and a mounting plate to be integral components of a housing from which the lock bolt protrudes at least in the locking position.

The invention will be more fully explained hereafter with the aid of the preferred embodiment illustrated in the drawing.

Figure 2:
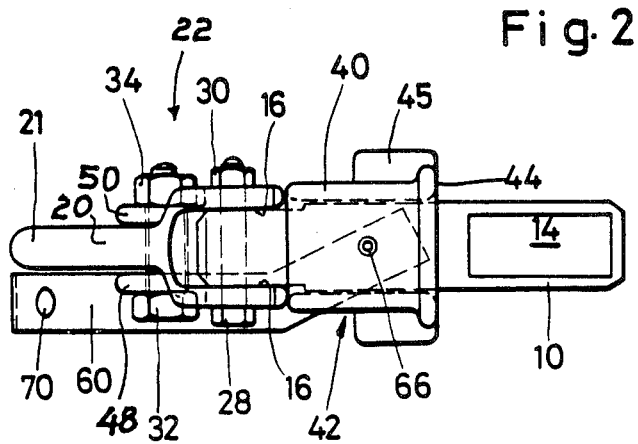

FIG. 1 shows a top plan view of the end locking device;

FIG. 2, a view of the device in the direction of arrows II—II in FIG. 1; and

Figure 3:
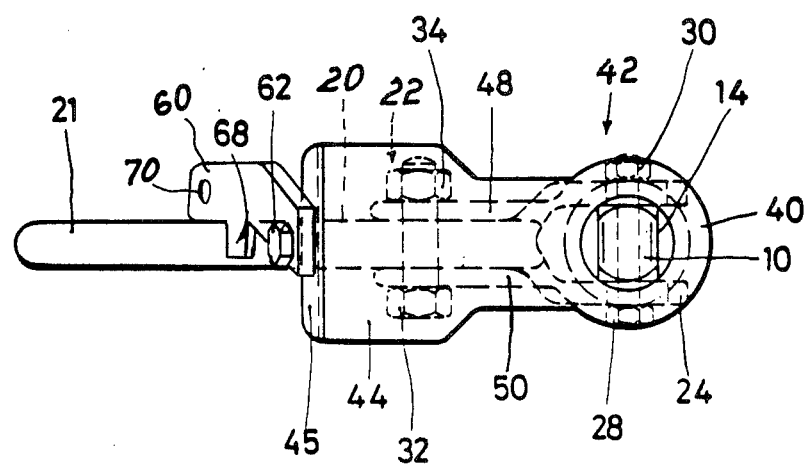

FIG. 3, a side elevation of the device in the direction of arrows III—III in FIG. 1.

The device features as a locking element a lock bolt 10 which with the aid of a pivotable operating handle 20 can be moved in the direction of its longitudinal axis 12. In FIG. 1, the lock bolt 10 and the operating handle 20 are illustrated in their locking position by solid lines and, in their position of release by broken lines.

In the embodiment, the lock bolt 10 is basically of a cylindrical design but features in the area of its two ends two flats 14, 16. The two end flats 14 of the lock bolt 10 are located in the installed condition of the device in vertical planes, and as illustrated in FIG. 1 these planes extend to the plane. The part of the lock bolt 10 upon which the flats 14 are located of the paper represents the locking section of the bolt.

Between the flats 14 and 16, the lock bolt 10 extends through a cylindrically bored or cast guide bushing 40 which is an integral part of a welded or cast housing 42. Pertaining to this housing 42, additionally, are a mounting plate 44 facing the flats 14 of the lock bolt 10 and a section 46 which, for one, supports a bearing 22 for the operating handle 20 and, for another, forms a stiffening connection between the guide bushing 40 and the mounting plate 44.

In the exemplary embodiment, the section 46 consists of two walls 48, 50 (see specifically FIG. 3) which extend perpendicularly to the mounting plate 44 and spaced from, as well as parallel with each other. Near the bearing 22, the two walls are connected by a lug 52 which in FIG. 1 is illustrated only by broken lines.

The operating handle 20 is fashioned as a dual handle. Its end facing the lock bolt 10 is biforcated, as can be seen from FIG. 2. The two sections of the fork 24 feature each an oblong hole 26 extending in the longitudinal direction of the operating handle 20. The fork 24 of the operating handle 20 straddles the rear end of the lock bolt 10 in the area of its rear flats 16 through which extends, incidentally, a transverse bore. A bolt 28 extends both through this cross bore and the two oblong holes 26 of the fork 24, thereby coupling the operating handle 20 and the lock bolt 10 with one another. A nut 30 screwed onto the bolt 28 serves to secure the coupling. For completeness sake it is pointed out that the planes of the flats 16 extend perpendicularly to the planes of the flats 14 of the lock bolt 10.

The operating handle 20 extends through the space between the walls 48, 50 of the housing section 46 and is held in pivotable fashion on the housing by means of the bearing 22. This bearing 22 is formed by a bearing bolt 32 which is inserted in two bores extending perpendicularly through the walls 48, 50 and into a corresponding bore provided in the operating handle 20, and it is secured with the aid of a nut 34. The free end of the operating handle 20 forms a grip 21. When the grip 21 is pivoted, the entire operating handle 20 pivots on the bearing 22, thus making it possible to move the lock bolt 10 from its locking position into its release position, which is illustrated by broken lines. The movement is limited in the locking position in that the fork 24 makes contact with the rear end of the guide bushing 40, and in the release position in that the operating handle 20 comes to rest on the lug 52 provided in the housing section 46.

To secure the operating handle position, and thus the locking bolt position, a handle locking lever 60 is provided. It is hinged on one end in pivotable fashion to a sideways, right-angle section 45 of the mounting plate 44, by means of a bolt 62 and a nut 64, and extends from there toward the operating handle somewhat beyond the locked position of the latter, as follows from FIGS. 1 and 2. Due to being mounted on the right-angle section 45, the locking lever 60 is able to swivel on a horizontal axis 66. This horizontal axis lies in the same plane as the longitudinal axis 12 of the lock bolt 10, as can be seen from FIGS. 2 and 3.

The locking lever 60 extends across the top side of the operating handle 20. The locking lever 60 is according to FIG. 2 slightly angled so that its longer part extends approximately parallel to the plane of the operating handle 20. Provided in the area of this longer part of the locking lever 60 is a locking nose 68. As the locking lever 60 assumes its position according to FIGS. 2 and 3, said locking nose extends into the swivel path of the operating handle 20. As can be seen from FIG. 1, the position and the dimensions of the locking nose 68 are so selected that the nose will lock the operating handle 20 with one edge in the locking position and with its other edge in the release position. As the locking lever 60 is lifted, the locking nose 68 retracts out of the path of the operating handle 20, permitting it now to be swiveled.

Incidentally, the locking lever 60 drops into its locking position under the influence of gravity. As an additional safety for this locking position, a bore 36 and/or 70 each are provided in the grip 21 of the operating handle 20 and in the area of the free end of the locking lever 60, through which bores a round cotter pin or another fastener can be inserted for securing the mutual position.

The described front end locking arrangement is welded as a complete assembly—usually—to the front end of a container chassis, specifically of a semitrailer, in a fashion such that the lock bolt 10 can be inserted in the usual front end bore of a container corner bracket in horizontal direction, from up front. Arranged for installation purposes, up front on the container chassis, is a vertical and massive plate which may be part of a beam extending transverse to the chassis and comprises in the area of the bearing point of the container corner bracket a horizontally extending through-bore with dimensions permitting the lock bolt to be pushed in from the front toward the rear. The thickness of the plate is approximately equal to the space between the mounting plate 44 of the device and the beginning of the flats 14 of the lock bolt 10. Two broken lines 80, in FIG. 1, indicate this plate which together with the locking devices in the rear area of the chassis absorbs the forces which are produced by braking.

Prior to placing a container on a chassis, the lock bolt 10 must be in its release position indicated by dash-dotted lines. Once the container has been positioned on the chassis, the lock lever 60 is lifted up and the grip 21 is swiveled (in FIG. 1 toward the left). During the swivel movement, the front part of the lock bolt 10 proceeds into the end bore of the container corner bracket. In the limit position, the locking lever 60 is released and will thus secure the operating handle 20 in the locked position.

The installation of the end locking device is conceivably simple. Its required position relative to the chassis is given by the mentioned hole in the chassis plate 80. All that is necessary for installation, therefore, in passing the lock bolt 10 through the mentioned hole in the plate 80 and placing the mounting plate 44 on the front end of the plate 80, whereafter only a welding operation is required for connecting the housing 42 with the container chassis.

Having described our invention, we claim:

1. A device for the front end locking of containers on a chassis comprising:
    a lock bolt,
    a guideway, said lock bolt being movable between a locking position in which one end of said lock bolt protrudes from one end of said guideway and a release position in which said one end of said lock bolt is retracted into said guideway,
    an operating handle pivotally secured at one end to said lock bolt, said handle being pivotally mounted on a holding fixture for movement in a first plane,
    said guideway and said holding fixture being jointly fixed on a mounting plate, said mounting plate being oriented perpendicular to said first plane within which said operating handle is movable,
    said mounting plate being located on one end of said guideway, said one end of said guideway being that end from which said lock bolt protrudes in the locking position of said lock bolt,
    a locking lever, said mounting plate having one end section spaced away from the lock bolt,
    handle blocking means on said locking lever,
    a locking lever support bearing located in said one end section of said mounting plate, and said locking lever being pivotally secured to said locking lever support bearing for movement of said lever and said handle blocking means between locked and unlocked positions relative to said handle.

2. A device according to claim 1 characterized in that the locking lever is movable in a plane which is perpendicular to said first plane within which said operating handle is movable.

3. The device of claim 1 wherein said guideway extends approximately parallel with the longitudinal axis of the chassis.

4. A device according to claim 1 characterized in that the guideway, the holding fixture, and the mounting plate are integral parts of a housing out of which said one end of said lock bolt protrudes in said locking position.

5. A device according to claim 4 characterized in that said housing is a casting.

6. A device according to claim 1 in which said holding fixture comprises two spaced walls which extend parallel to each other and perpendicular to said mounting plate,
    a bearing extending between said two spaced walls, and said operating handle being supported from said bearing.

7. A device according to claim 6 in which said spaced walls are in the area between the mounting plate and the bearing, said spaced walls being connected with each other by a lug that forms a stop for the operating handle in its release position.

* * * * *

UNITED STATES PATENT AND TRADEMARK OFFICE
CERTIFICATE OF CORRECTION

PATENT NO. : 4,486,132

DATED : Dec. 4, 1984

INVENTOR(S) : Gerd Schulz & Hans-Peter Hartleif

It is certified that error appears in the above-identified patent and that said Letters Patent is hereby corrected as shown below:

Column 1, line 21, "arrngements" should be -- arrangements --

Column 1, line 49, "pertaining to" should be -- characteristic of --

Column 2, line 8, after "extend" insert -- vertically --; after "plane" insert -- of the paper --

Signed and Sealed this

Eighteenth Day of June 1985

[SEAL]

Attest:

DONALD J. QUIGG

*Attesting Officer*   *Acting Commissioner of Patents and Trademarks*